C. HENRY.
GRAIN SHOCKER.
APPLICATION FILED JAN. 18, 1913.
1,099,176.
Patented June 9, 1914.
6 SHEETS—SHEET 2.
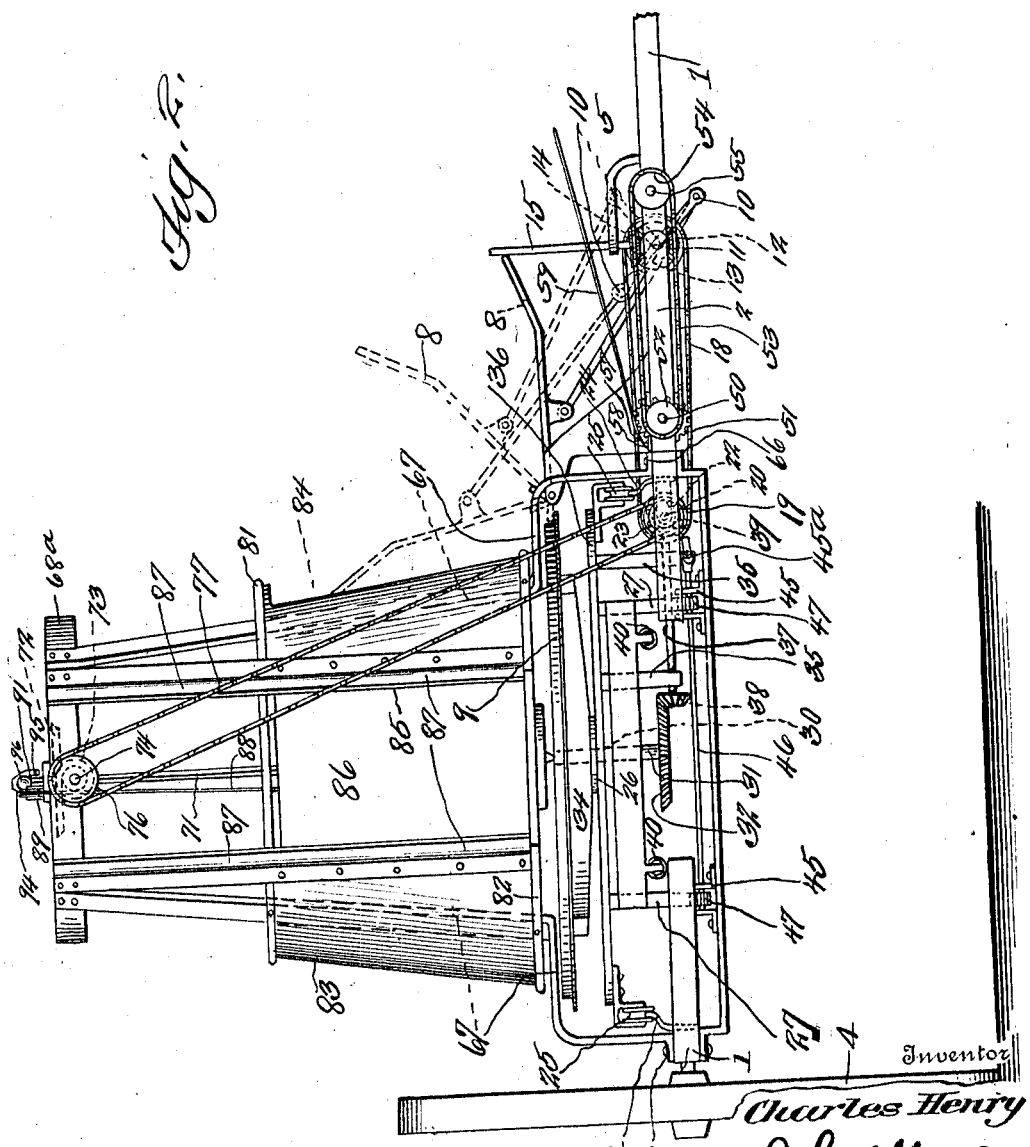

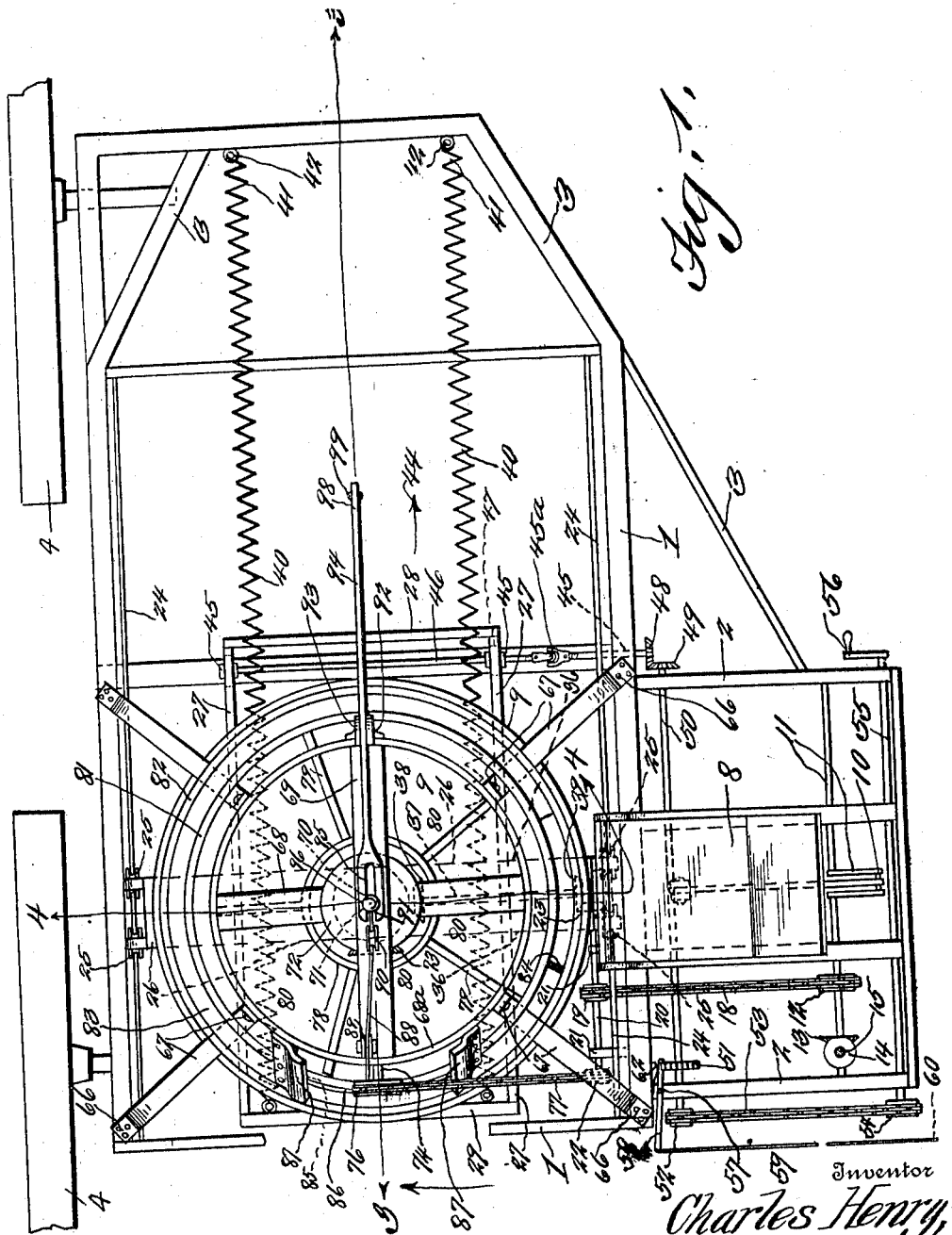

C. HENRY.
GRAIN SHOCKER.
APPLICATION FILED JAN. 18, 1913.
1,099,176.
Patented June 9, 1914.
6 SHEETS—SHEET 3.
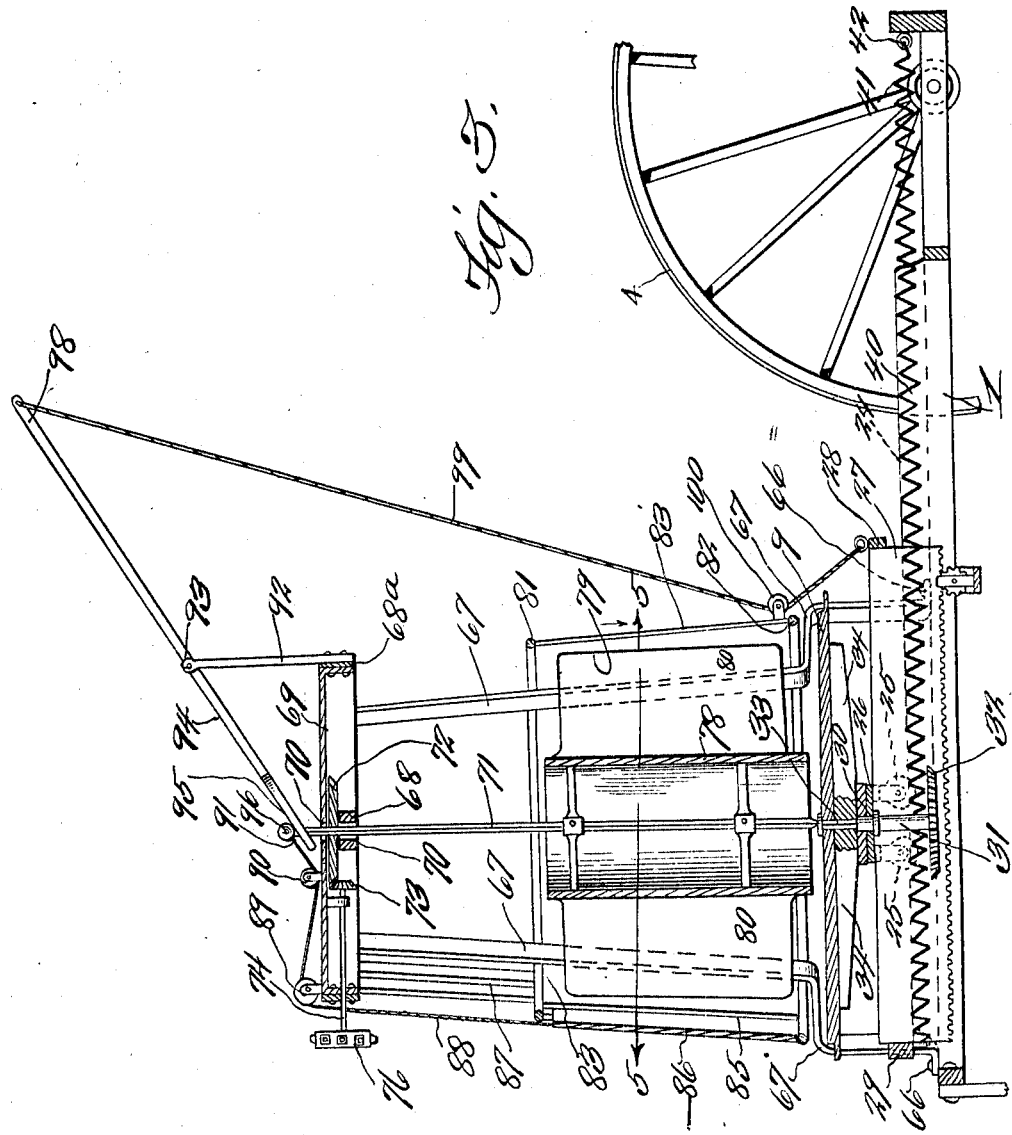
Witnesses
Mark DeGrange.
Francis T. Boswell.
Inventor
Charles Henry,
By D. Swift & Co.
Attorneys C. HENRY.
GRAIN SHOCKER.
APPLICATION FILED JAN. 18, 1913.
1,099,176.
Patented June 9, 1914.
6 SHEETS—SHEET 4.
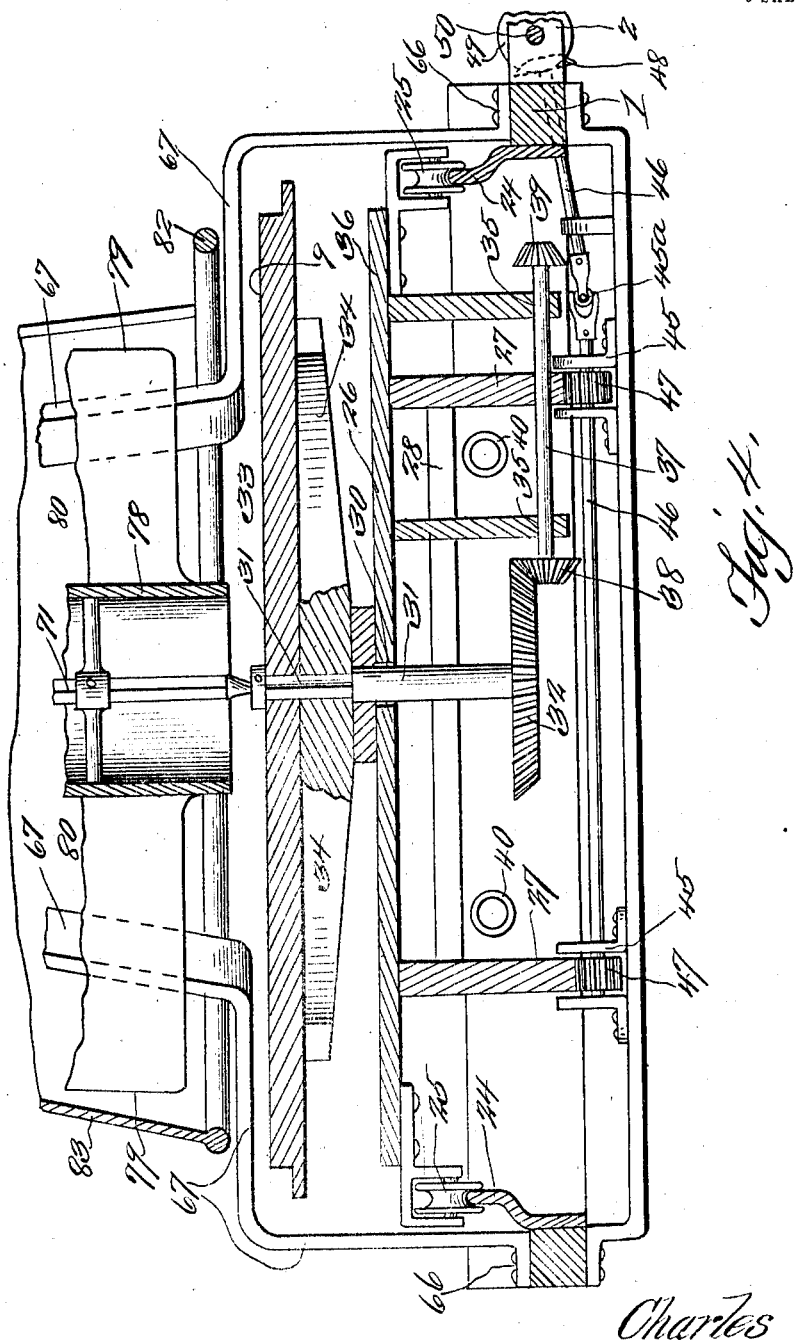

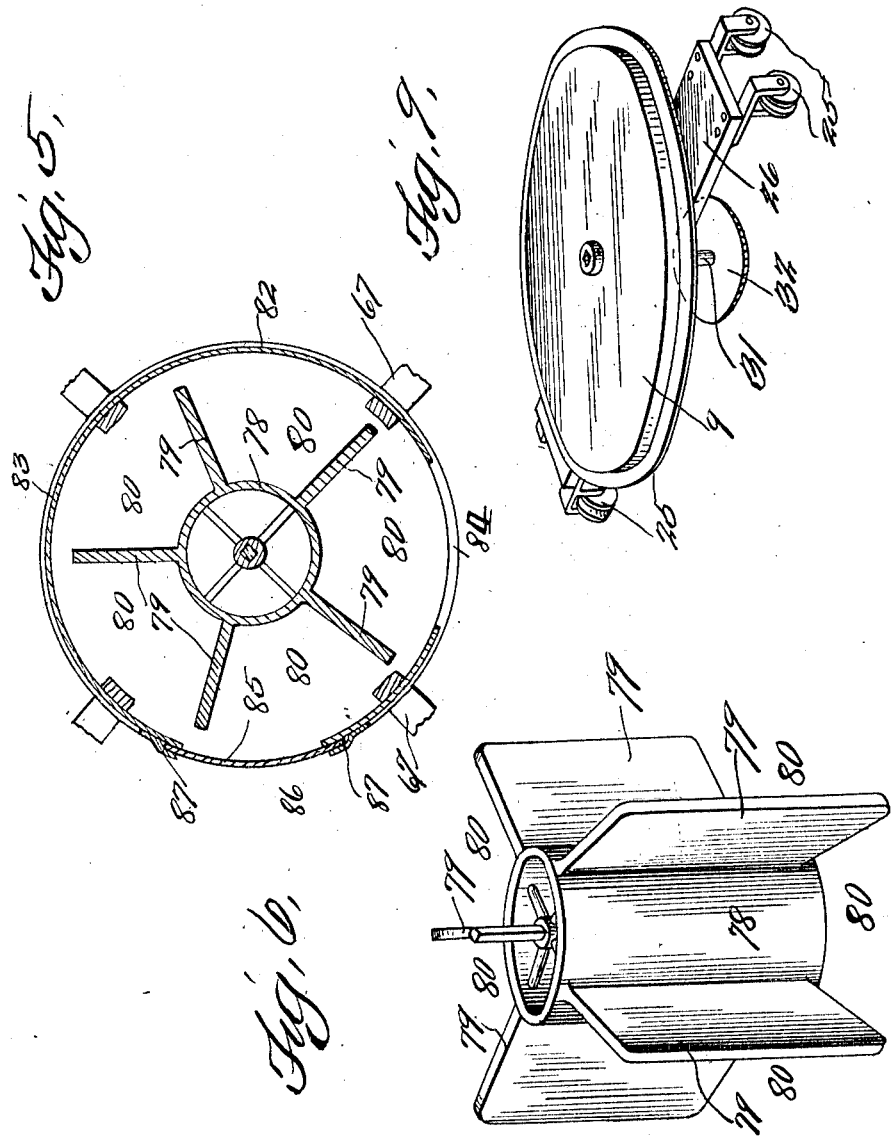

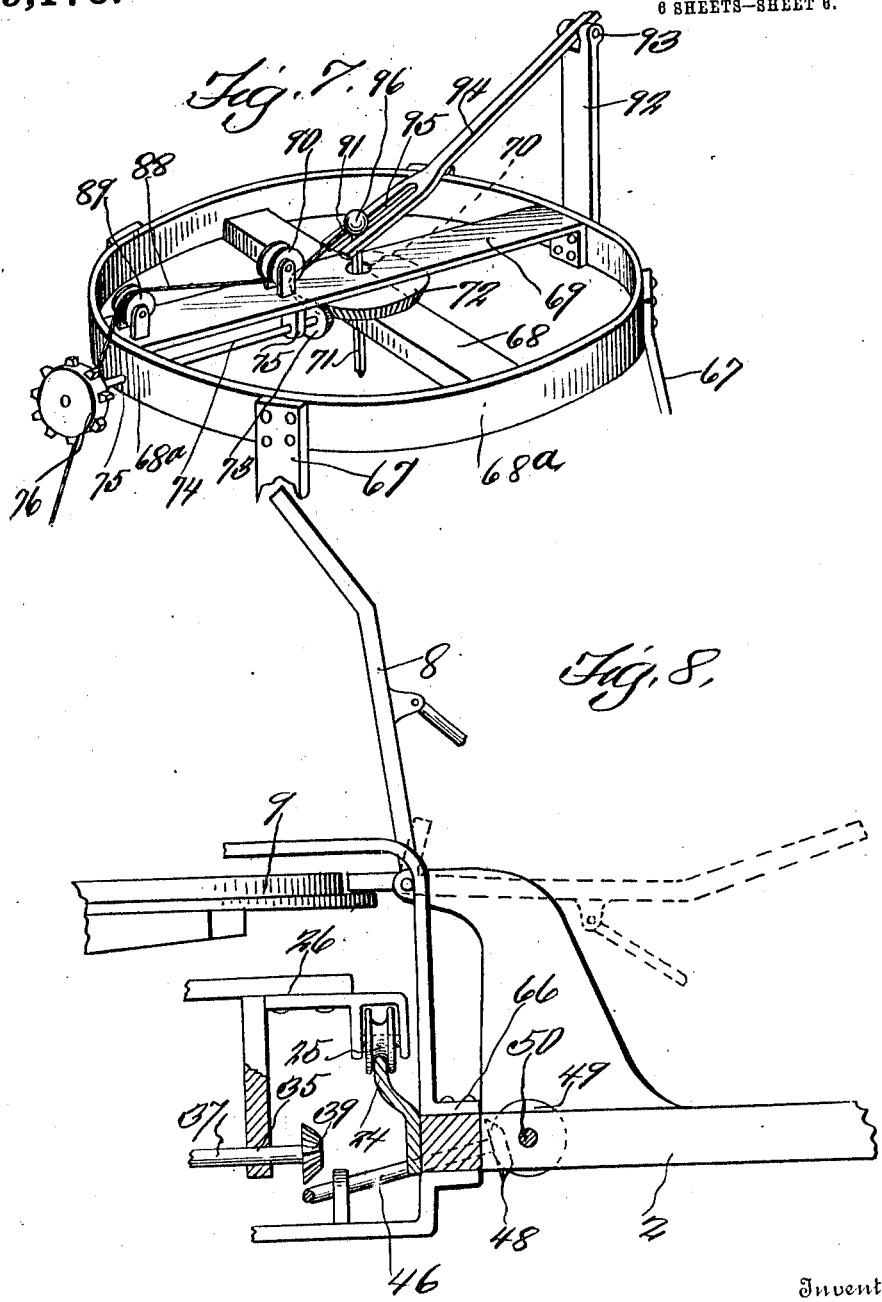

UNITED STATES PATENT OFFICE.

CHARLES HENRY, OF GACKLE, NORTH DAKOTA.

GRAIN-SHOCKER.

1,099,176.  Specification of Letters Patent.  Patented June 9, 1914.

Application filed January 18, 1913. Serial No. 742,928.

*To all whom it may concern:*

Be it known that I, CHARLES HENRY, a citizen of the United States, residing at Gackle, in the county of Logan and State of North Dakota, have invented a new and useful Grain-Shocker; and I do hereby declare the following to be a full, clear, and exact description of the invention, such as will enable others skilled in the art to which it appertains to make and use the same.

This invention relates to a new and useful grain shocking machine.

As one of the objects of the invention it is the aim to provide a novel form of shocker, adapted for connection to a binder, to receive the bundles from the binder, and after the required number of bundles have been received to form a shock, the entire shock is dropped or deposited in the field.

As another object of the invention, there is provided an intermittent revoluble platform over which an inner and outer cylindrical hood is arranged, there being a plurality of compartments, to receive two or more bundles of grain stalks from the binder, there being means for intermittently rotating the platform and the inner hood, in order to bring each compartment into position to receive the bundles.

As another object of the invention, there is produced novel means for simultaneously moving the platform forwardly and raising the hoods, in order to drop the entirely formed shock upon the ground.

There are disclosed in the drawings certain features of construction, but in practical fields these features may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a plan view of the improved shocker. Fig. 2 is a rear view of the improved grain shocker, showing the same connected to a small portion of a binder. Fig. 3 is a sectional view on line 3—3 of Fig. 1. Fig. 4 is a sectional view on line 4—4 of Fig. 1. Fig. 5 is a horizontal sectional view on line 5—5 of Fig. 3. Fig. 6 is a detail view of the inner hood or cylinder. Fig. 7 is an enlarged detail perspective view of the upper portion of the shock frame. Fig. 8 is a detail view, showing how the carriage or frame 26 is mounted, illustrating a portion of the table or platform 9, and disclosing the fork or member 8 in a raised position. Fig. 9 is a detail perspective view of the turn table, showing the carriage 26.

Referring more especially to the drawings, 1 designates a frame having a forwardly extending portion 2. This frame is suitably braced by the rods or bars 3, and is mounted upon suitable wheels 4 at the end 5 of the frame 1, the discharge end (not shown) of any suitable binder (not shown) may be connected. The bundles as they are discharged from the binder are received by a pivoted member 8, which pitches the bundles upon the platform 9. This pivoted member 8 has connections 10 to the crank shaft 11, which is mounted in bearings of the offset portion 2 of the frame 1. The shaft 11 is provided with a sprocket wheel 12 and a beveled gear 13. The beveled gear 13 meshes with a beveled gear 14, which is mounted upon and rotatable with the shaft 15. This shaft 15 may be driven by any suitable means (not shown) of the binder (not shown). By this arrangement motion is imparted to the shaft 11 intermittently, as will be hereinafter ascertained. A sprocket chain 18 travels about the sprocket 12, and in turn travels about the sprocket 19 of the shaft 20, which is mounted in bearings 21 of the said frame. On one end of the shaft 20 a sprocket 22 is mounted, while on the other end a beveled gear 23 is provided.

The frame 1 is constructed with a pair of guide rails or tracks 24 with which the roller wheels 25 engage. The roller wheels 25 support the carriage frame 26, which extends transversely of the frame 1. Connected to the carriage frame are two rack bars 27, the ends of which are connected by the bars 28 and 29.

Mounted in a bearing 30 of the carriage or frame 26 is a shaft 31, with which a beveled gear 32 is rotatably mounted. The platform 9 which is circular in plan view, is secured at 33 to the shaft 31 so as to move therewith, there being braces 34 for the platform. Mounted in bearings 35 of the portion 36 of the carriage 26 is a shaft 37 having gears 38 and 39 upon its ends. The gear 38 meshes with the gear 32, so as to impart motion thereto and to the platform, while the gear 39 meshes with the gear 23, that is, only when the carriage 26 is arranged as shown in Fig. 1. Upon examining the drawings it will be seen that by virtue of the shaft 11, the gear 32 and platform are intermittently revolved owing to the intermeshing of the gears 23 and 39 of the shafts 20 and 37, which shaft 20 is driven by the chain 18.

Connected to the bar 29, which connects the rack bars, are two long springs 40, the other ends 41 of which are connected at 42 to the braces of the frame 1. These springs 40 are designed for automatically moving the carriage, the rack bars, the platform, the gear 32 and the shaft 37 in the direction of the arrow 44, all as one body.

Mounted in bearings 45 of the frame 1 is a shaft 46 having gears 47, which mesh with the rack bars 27. This shaft 46 comprises two sections, as clearly shown in Fig. 4, joined together by universal connection 45ª. On one end of the shaft 46 a beveled gear 48 is arranged, which meshes with the beveled gear 49 of the shaft 50. The shaft 50 is mounted in bearings of the offset frame 2 and is provided with a gear 51 and a sprocket 52. Passing about the sprocket 52 is a chain 53, which also travels about the sprocket 54 of the shaft 55, at one end of which the crank 56 is arranged. Pivoted at 57 is a dog 58, one end of which engages the teeth of the gear 51, while the other end of said dog has a pitman 59 connected to it. This pitman 59 is adapted to be connected to a foot pedal (not shown), so that the pitman may be operated. A spring 62 is provided for holding the dog 57 in engagement with the teeth of the gear 51. When the carriage 26 is in a position as shown in Fig. 1 the springs 40 are under tension. The carriage 26 is held in such position, owing to the fact that the dog 57 is in engagement with the teeth of the gear 51, thereby preventing the springs 40 from pulling or moving the carriage 26 along the guide rails.

By holding the carriage in the position as shown in Fig. 1, the gears 23 and 39 are held in mesh, until the platform 9 has received a sufficient number of bundles of grain to compose a shock. After the required number of bundles of grain or other material have been received upon the platform to compose a shock, the operator presses the foot pedal (not shown), and by this action, the dog 57 is disengaged from the teeth of the gear 51 against the action of the spring 62, through the medium of the pitman 59. When the gear 51 is thus released, the springs 40 pull or move the carriage along the guide rails, and with it the platform, thereby allowing the shock to fall upon the ground.

After one shock has been deposited on the ground, the carriage is returned and with it the platform to the position shown in Fig. 1. To accomplish this an operator rotates the shaft 55 by means of the crank 56, thereby operating the chain 53, which imparts motion to the shaft 50 owing to the sprocket 52. In this case the shaft 50 rotates in a reverse direction, and the dog 57 slips by the teeth of the wheel 51. When the shaft 50 is rotated in this reverse direction, the shaft 46 is operated owing to the intermeshing of the gears 48 and 49. When the shaft 46 is rotated in a reverse direction to that when the springs 40 move the frame or carriage on the guide rails, the meshing of the gears 47 with the rack bars 27 cause the carriage 26 with the platform 9 to be returned to the position shown in Fig. 1, to receive the bundles of grain for another shock.

Every time the pivoted member 8 is thrown downwardly in the position shown in full lines in Fig. 2, the same receives the two bundles of grain, in lengthwise position, from any suitable or conventional form of binder (not shown). As every two bundles of grain are received upon the pivoted member 8, they are pitched upon the platform 9 in the compartments 80 as they pass the opening 84. After each compartment has received two bundles, it will be seen that there is a sufficient number of bundles to form a shock.

Rising from the frame 1 as indicated at 66 are four standards 67, the upper portions of which are connected by two spaced apart frames 68 and 69. These frames 68 and 69 hold the standards 67 in position, and mounted in bearings 70 of said frames is a rectangular shaft 71 having a beveled gear 72, which meshes with a beveled gear 73 on the shaft 74, which is mounted in bearings 75 of the frame 68ª. The shaft 74 is provided with a sprocket wheel 76, which has a chain connection 77 with the sprocket 22 of the shaft 20, and when the shaft 20 is rotated, in order to partially move the platform 9, the shaft 71 is correspondingly moved, through the intermeshing of the gears 72 and 73. The shaft 71 is designed to slide through the gear 72 at times. Carried by the lower portion of the shaft 71 is a cylinder 78 having five radial wings 79, forming five compartments 80, each compartment being designed to receive two bundles from the fork. When the shaft 71 is rotated correspondingly with the platform 9, another compartment is rotated to a position to receive two bundles of stalks from the pivoted member 8. Slidable upon the standards 67 are two annular rings 81 and 82, which are connected by a sheet metal hood 83 or casing, the upper and lower ends of which are opened. This casing or hood is provided with two openings 84 and 85, through the opening 84 the bundles are deposited or thrown into the compartments, while the opening 85 is provided with a closure 86 slidably mounted in the guides 87. This closure 86 has connected to it a cable, chain or the like 88 passing over a pulley 89 and under another pulley 90 and connected to the upper end of the shaft 71 at 91. An arm 92 projects upwardly from the frame 68ª, and fulcrumed to the upper end of the arm, as at 93 is a lever 94. One end of the lever is provided with an elongated slotted portion 95, through which the upper end of the shaft 71 extends, there being an enlargement 96, above the slotted portion 95. When the lever 94 is rocked, the shaft 71 is bodily raised and lowered, and when raised the cylinder 78 with the divisional wings is also raised. The end 98 of the lever 94 has connected to it a cable, chain or the like 99 which passes under a pulley 100, and is in turn connected to the bar 28 of the rack bars 27. When the carriage 26 with the rack bars 27 and the platform 9 are all as one body moved upon the guide rails 24 by the contraction of the springs 40, the lever 94 is rocked upon its fulcrum, owing to the connection of the cable or the like 99 between the lever 94 and the bar 28. In this manner, the shaft 71, the cylinder 78 with the wings, and the closure 86 are raised at the same time the platform is moved from under the shock. In this manner the shock is allowed to fall or drop to the ground easily and unobstructed.

When a shock is discharged by the carriage and the platform moves forwardly, the closure or slide 86 is automatically raised, so as to permit the top portion of the shock to pass through the opening, which is normally closed by the closure or slide 86.

The invention having been set forth, what is claimed as new and useful is:—

1. In a grain shocker, a frame having guide rails, a carriage mounted upon said rails and provided with a platform, a mechanism for holding the carriage at one end of the frame, and means for automatically pulling the carriage and the platform from under a shock and to the other end of the frame when released by said mechanism in order to drop the shock on the ground, a member on the platform having divisional wings forming compartments, and means of connection between said member and the carriage for raising the member simultaneously with the movement of the carriage, and means for revolving the platform and the member intermittently and simultaneously.

2. In a grain shocker, a frame having guide rails, a carriage mounted upon said rails and provided with a platform, a mechanism for holding the carriage at one end of the frame, and means for automatically pulling the carriage and the platform from under a shock and to the other end of the frame when released by said mechanism in order to drop the shock on the ground, a member on the platform having divisional wings forming compartments, and means of connection between said member and the carriage for raising the member simultaneously with the movement of the carriage, and means manually actuated for operating said mechanism to return said carriage to its initial position, and means for revolving the platform and the member simultaneously and intermittently.

3. In a grain shocker, a frame having guide rails, a carriage having roller wheels mounted upon the rails and provided with a platform, a rack frame carried by the carriage, a mechanism having devices coöperating with said rack frame, means coöperating with said mechanism for holding the carriage and the rack frame at one end of the first frame, coil springs connecting between the first frame and the rack frame for automatically pulling the carriage and the rack frame to the other end of the first frame when released by said mechanism, said mechanism adapted to be manually released, a member on the platform having divisional plates forming a series of compartments to receive bundles of grain, an inclosure surrounding the series of compartments, means of connection between said member and the rack frame for raising the member and the divisional plates simultaneously with the movement of the carriage forwardly upon the rails, means for revolving the platform and the member including the divisional plates intermittently and simultaneously, and means manually actuated for operating said mechanism to return the carriage to its initial position, the member being lowered from a raised position by force of gravitation when the carriage is returned to its initial position.

In testimony whereof I have signed my name to this specification in the presence of two subscribing witnesses.

CHARLES HENRY.

Witnesses:
R. S. NILLEN,
JACOB HUMMEL.